United States Patent [19]

Arnemann

[11] 4,443,148
[45] Apr. 17, 1984

[54] APPARATUS FOR UNLOADING BULK MATERIAL FROM SHIPS

[76] Inventor: Gerhard Arnemann, Am Kroenrey 11, D-2083 Halstenbek, Fed. Rep. of Germany

[21] Appl. No.: 379,142

[22] Filed: May 17, 1982

[30] Foreign Application Priority Data

May 14, 1981 [DE] Fed. Rep. of Germany ....... 3119292

[51] Int. Cl.³ .............................................. B65G 63/00
[52] U.S. Cl. .................................... 414/139; 198/518; 198/660
[58] Field of Search ................ 414/137, 139, 140, 144, 414/145, 319, 320, 321; 198/511, 513, 518, 660

[56] References Cited

U.S. PATENT DOCUMENTS

| | | | |
|---|---|---|---|
| 3,229,827 | 1/1966 | Kucera | 414/319 X |
| 3,458,028 | 7/1969 | Tidemand-Johannesson | 198/660 X |
| 3,605,995 | 9/1971 | Maack | 198/660 |
| 3,836,019 | 9/1974 | Aralt | 414/139 |
| 3,968,998 | 7/1976 | Wolf | 414/319 X |
| 4,284,369 | 8/1981 | Gsponer et al. | 414/139 X |
| 4,286,909 | 9/1981 | Tingskog | 414/139 X |
| 4,334,818 | 6/1982 | Tingskog | 414/145 X |

Primary Examiner—Robert J. Spar
Assistant Examiner—Ken Muncy
Attorney, Agent, or Firm—Toren, McGeady and Stanger

[57] ABSTRACT

An apparatus for unloading bulk material from ships includes a vertical conveyor arranged on a pivotable jib of a rising scaffold bridge. Since in the case of known vertical conveyors it is not possible to take up the bulk material to the very bottom a ship to be unloaded, the apparatus provides a bulk material unloading apparatus for ships in which in the bottom area the vertical conveyor cooperates with a horizontal conveyor arranged in a casing, which is open in the bulk material receiving area along the horizontal conveyor. The bulk material taken up by the horizontal conveyor is conveyed into the receiving area of the vertical conveyor at the end of the conveying zone by a guide plate. This apparatus makes it possible to take up bulk material to the very bottom of the ship to be unloaded, while ensuring a high working efficiency and capacity.

10 Claims, 4 Drawing Figures

APPARATUS FOR UNLOADING BULK MATERIAL FROM SHIPS

SUMMARY OF THE INVENTION

The invention relates to an apparatus for unloading bulk material from ships with a vertical conveyor arranged on a pivotable jib or cantilever of a rising scaffold bridge or the like having a bracing tube and with a conveyor screw arranged therein, which takes up the loose material on the bottom side and conveys it to an upper discharge end, whereby a portion of the conveyor screw is passed out of the bottom end of the bracing tube for taking up the bulk material.

Vertical screw conveyors of the aforementioned type are known in the most varied constructions and are used for the vertical conveying of bulk materials, the screw of the vertical conveyor conveying the material from a bottom receiving area to a higher discharge area.

It is a disadvantage of these known vertical screw conveyors that it is not possible to take up the bulk material right down to the bottom of e.g. a ship which is to be unloaded, because there is no adequate feed of the bulk material to the bottom side receiving end of the vertical conveyor screw and the receiving end of said screw works at a distance above the ship's hull.

It is an object of the present invention to provide a vertical screw conveyor for unloading bulk material from ships permitting the taking up of bulk material right down to the bottom of the ship to be unloaded, whilst also permitting the taking up of residual bulk material, whilst ensuring a high working efficiency and automatic adaptation to the different submergence depths of the ship during the unloading process.

For solving this problem an apparatus for unloading bulk material from ships of the aforementioned type is proposed, which according to the invention is constructed in such a way that at the bottom end of the bracing tube and in the vicinity of the bulk material receiving portion of screw conveyor of vertical conveyor there is provided a horizontal conveyor, whose longitudinal axis is approximately at a right angle to the longitudinal axis of the vertical conveyor and comprising a casing which is open on the bottom side and on the side facing the bulk material receiving portion of the conveyor screw and which is closed at the ends, whilst receiving in its inner area a further conveyor screw and at the discharge side end of the conveyor screw a guide plate inclined towards the rear area of conveyor screw of vertical conveyor.

With such an apparatus it is possible to take up bulk material down to the bottom of the ship to be unloaded, because the horizontal conveyor associated with the vertical conveyor conveys the bulk material taken up by said horizontal conveyor directly into the receiving area of the vertical conveyor. In addition, such an unloading apparatus also has a very high working efficiency and capacity, which can be attributed to the fact that as a result of the horizontal conveyor used there is a very large bulk material reception area. Due to the fact that the horizontal conveyor is arranged with respect to the vertical conveyor in such a way that there is a rectangular bulk material receiving surface area, the horizontal conveyor is in a position to take up loose material over its entire length and supply it to the vertical conveyor, which also takes up bulk material itself. Therefore, the receiving and conveying capacity of the vertical conveyor is considerable. In addition, the conveyor screw of the horizontal conveyor does not convey the bulk material conveyed by it directly into the receiving area of the conveyor screw of the vertical conveyor. Instead it brings about a direct supply to the vertical conveyor via a sloping guide plate located at the discharge end of the conveyor screw of the horizontal conveyor, without there being any lateral dispersions.

According to a further advantageous development of the invention, the horizontal conveyor with the conveyor screw is arranged on the bracing tube of the vertical conveyor so as to be rotatable about its vertical axis, so that the horizontal conveyor can always be adjusted in such a way that a large bulk material quantity can be taken up and it is possible to reach any point in the hold.

In order also to be able to take up bulk material which has not been taken up by the horizontal and vertical conveyors and which is located e.g. in depressions and the like in the hold, a suction device is connected downstream of the horizontal conveyor and enables the taking up of residual bulk material. It is particularly advantageous in this connection if the bulk material taken up by the suction device is conveyed directly into the conveying channel of the vertical conveyor.

The invention also provides for an arrangement of the horizontal conveyor and a development of the bottom end of the conveyor screw of the vertical conveyor in such a way that horizontal conveyor and vertical conveyor can automatically adapt to submergence depth changes and rolling of the ship to be discharged during the discharging process. This is achieved in that the bottom end of the bracing tube of the vertical conveyor is constructed so as to be telescopically extendable and retractable, whilst the free bottom portion of the conveyor screw of the vertical conveyor comprises resilient elastic screw channel or flight portions for varying the length of the screw and to which is connected the extendable and retractable portion of the bracing tube.

Further advantageous developments of the invention can be gathered from the subclaims.

BRIEF DESCRIPTION OF THE DRAWING

The invention is described in exemplified manner hereinafter relative to the drawings, wherein show.

DETAILED DESCRIPTION OF THE PREFERRED EMBODIMENT

Figure 1:
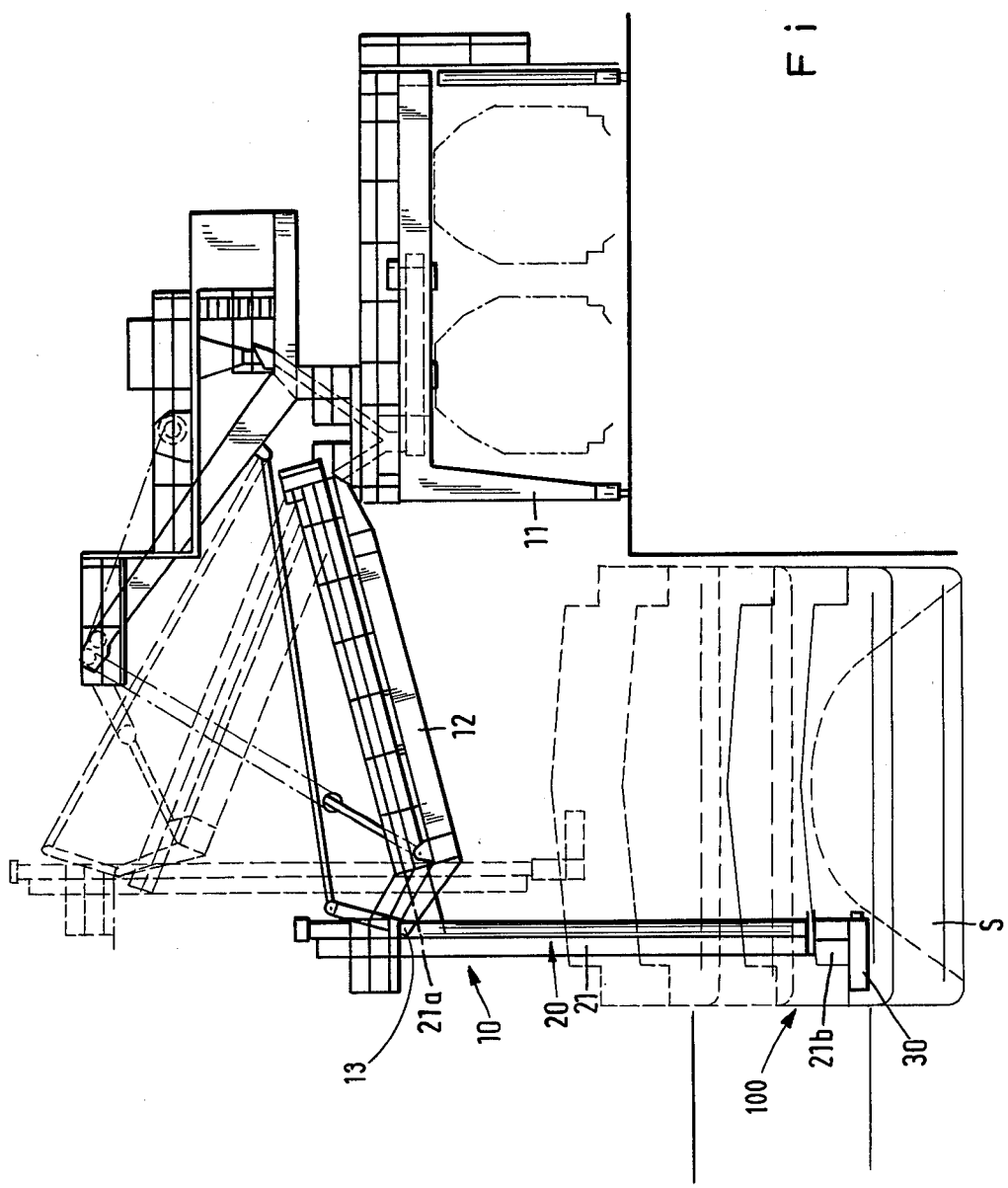
FIG. 1 an apparatus for unloading ships in a side view.

The apparatus 10 for unloading a ship, barge or the like 100 in FIG. 1 comprises a portal-like rising scaffold bridge 11 with a jib 12, which can be brought into different angles of tilt. A vertical conveyor 20 is articulated at 13 to the free end of jib 12. The vertical conveyor 20 is arranged in such a way that for each angular position of jib 12 conveyor 20 assumes a vertical position by means of the guide linkage shown in FIG. 1.

Vertical conveyor 20 comprises a bracing tube 21 with an upper end 21a and a lower end 21b. A conveyor screw 25, constructed in per se known manner is located in the inner area of bracing tube 21 and a portion 26 of said screw 25 extends out of the lower end 21b of bracing tube 21 of conveyor 20 for taking up bulk material. The drive shaft of conveyor screw 25 is indicated at 27 and is connected to a drive not shown in the drawings.

Figure 3:
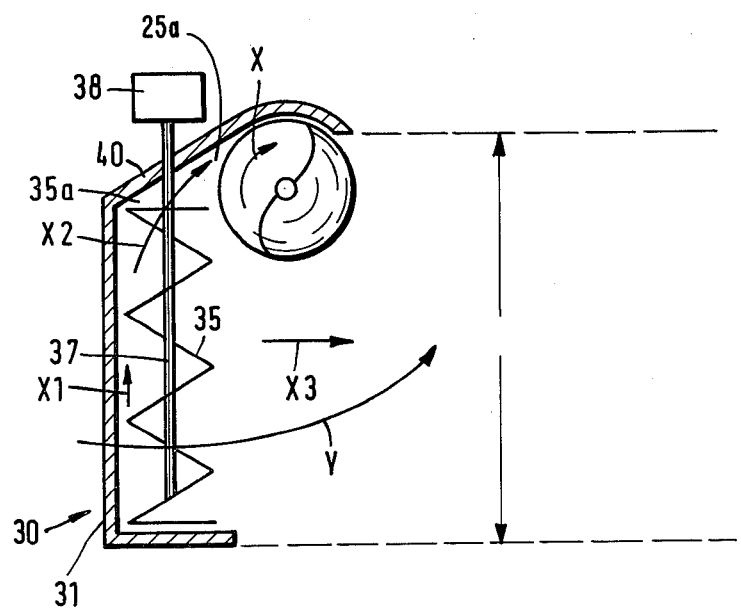
FIG. 3 a horizontal section through the vertical conveyor with a plan view of the horizontal conveyor.

A horizontal conveyor 30 is arranged at the lower end 21b of bracing tube 21 of vertical conveyor 20 and comprises a casing 31 and a conveyor screw 35 located in the inner area of the casing and whose drive shaft 37 is connected to the drive indicated at 38 in FIG. 3.

Figure 2:
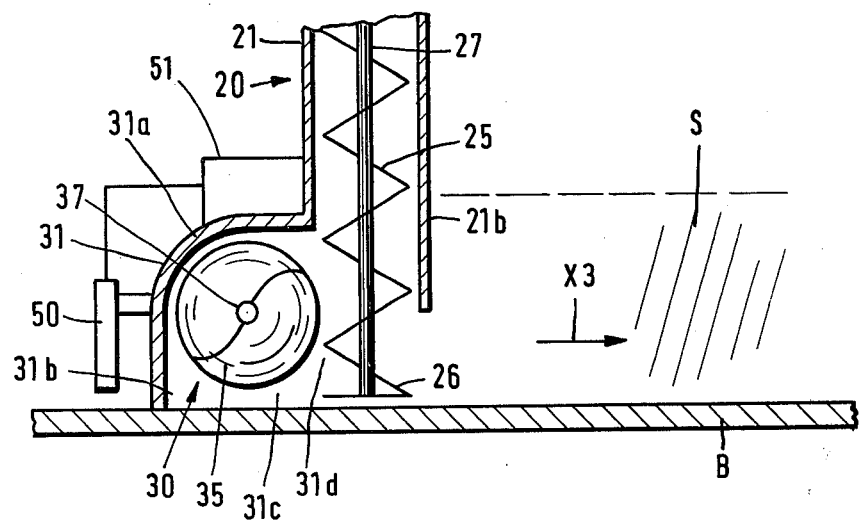
FIG. 2 the bottom end of the vertical conveyor with the horizontal conveyor, partly in elevation and partly in a vertical section.

Casing 31 of horizontal conveyor 30 is open at the bottom and on the side facing the bulk material receiving portion 26 of conveyor screw 25 of vertical conveyor 20. Thus, casing 31 is formed by the two side walls 31a, 31b (FIG. 2). In addition, casing 31 is closed at both sides. At the discharge side end 35a of conveyor screw 35 is provided a sloping guide plate 40 through which passes the drive shaft 37 of screw 35 and is arranged in such a way that it issues into the rear area 25a of screw 25 of vertical conveyor 20. (FIG. 3).

Horizontal conveyor 30 is approximately at a right angle to vertical conveyor 20, as can be gathered from FIG. 3.

An unloading apparatus constructed in this way functions as follows. Conveyor screw 25 of vertical conveyor 20 can be driven so as to rotate in the direction of arrow X as shown in FIG. 3. Conveyor screw 35 of horizontal conveyor 30 is driven in such a way that the bulk material S taken up by screw 35 is conveyed in the direction of arrow X1 to guide plate 40. Guide plate 40 diverts the bulk material supplied by conveyor screw 35 in the direction of arrow X2 and supplies it to the receiving portion 26 of screw 25, which conveys the bulk material which it has received into the upper area 21a of vertical conveyor 20, where the bulk material is then removed. For this purpose the top area 21a of bracing tube 21 is provided with a removal opening, which is advantageously constructed in such a way that the bulk material discharged in the upper area of vertical conveyor 20 can be removed by correspondingly constructed conveying means. The conveying means are housed in the jib 12 of rising scaffold bridge 11. The arrangement of vertical conveyor 20 with horizontal conveyor 30 need not be provided on a rising scaffold bridge 11. It is also possible to use other carrying and conveying means. The possibility also exists of fixing the vertical conveyor 20 e.g. to the roof of a shed or the like.

During the unloading process vertical conveyor 20 with its horizontal conveyor 30 are advanced towards the bulk material S in the direction of arrow X3 (FIGS. 2 and 3). Due to the arrangement and association of horizontal conveyor 30 with vertical conveyor 20, bulk material is not only taken up by conveyor screw 35 of horizontal conveyor 30 and conveyor screw 25 of vertical conveyor 20, but screw 25 of conveyor 20 also takes up bulk material alongside the horizontal conveyor. Due to the fact that the bulk material taken up and conveyed by conveyor screw 35 of horizontal conveyor 30 is fed via guide plate 40 to conveyor screw 25 of vertical conveyor 20, it is ensured that the bulk material taken up and conveyed by the horizontal conveyor is supplied in its entirety to conveyor 20 and can be taken up by its screw 25, without being in any way lost along the conveying path. FIG. 3 also shows the large area of bulk material which can be worked by vertical conveyor 20 with its horizontal conveyor 30.

In order to be able to align horizontal conveyor 30 with its conveyor screw 35 with the bulk material to be taken up, casing 31 of conveyor 30 is fixed to bracing tube 21 of vertical conveyor 20 in such a way that conveyor 30 can be pivoted about the vertical longitudinal axis of conveyor 20 in the direction of arrow Y (FIG. 3). Due to this pivotability, horizontal conveyor 30 can be rotated about the vertical longitudinal axis of vertical conveyor 20 by 390°. For this rotatability casing 31 of horizontal conveyor 30 is advantageously held on bracing tube 21 of vertical conveyor 20 by a swivel, which is not shown in the drawings.

In order to be able to take up bulk material residues left behind in depressions, gaps, etc. on the bottom B of e.g. a ship, a suction device 50 is connected downstream of horizontal conveyor 30 and connected to a vacuum production means indicated at 51 in FIG. 2 and which can be used for sucking up bulk material residues left behind at the bottom B of a ship. Advantageously suction device 50 is connected to the inner area of bracing tube 21, so that the sucked up bulk material can be conveyed upwards by means of conveyor screw 25 of vertical conveyor 20. Suction device 50 can comprise one or more suction nozzles, whose suction openings are located above the ship's bottom B. It is also possible to use a single suction nozzle, which then has a length corresponding approximaterly to the length of horizontal conveyor 30.

Figure 4:
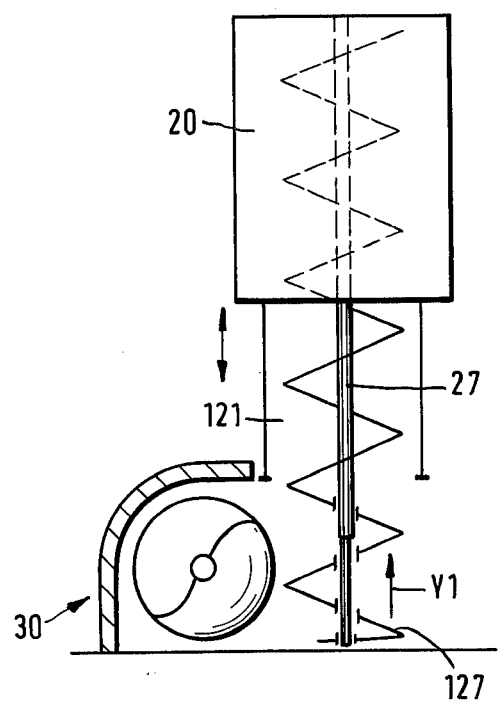
FIG. 4 the bottom end of the vertical conveyor and the horizontal conveyor with devices for adapting to different submergence depths of a ship during the discharging process in a diagrammatic side view.

To be able to adapt the complete apparatus to different submergence depths or to rolling of the ship during the unloading process, vertical conveyor 20 with its conveyor screw 25 in the bottom area and horizontal conveyor 30 with its conveyor screw 35 are constructed in a vertically adjustable manner. For this purpose the lower end 21b of bracing tube 21 of vertical conveyor 20 is constructed telescopically and has an extendable and retractable portion 121. In the same way drive shaft 27 of conveyor screw 25 is provided with an extendable and retractable portion 127. The screw flight forming the conveyor screw 25 is fixed in its bottom area to the free end of the extendable and retractable drive shaft portion 127, whilst the overlying screw flight portions are slidingly guided in one area on the drive shaft portion 127 or drive shaft 27. This sliding guidance is such that there is a vertical displaceability in the direction of arrow Y1 and in spite of this the extendable and retractable drive shaft portion 127 participates in the rotation of drive shaft 27, which is made possible by slots and wedge-shaped guides. In this displaceable area the screw flight of conveyor screw 25 is made from a resilient elastic material or comprises a material which permits a certain longitudinal displaceability and which springs back on return to the initial position (FIG. 4). Casing 31 of horizontal conveyor 30 is fixed to the extendable and retractable portion 121 of bracing tube 21 of vertical conveyor 20 and thus participates in the vertical adjustability of said tube portion 121. By means of corresponding springs, which are not shown in the drawings, it is ensured that horizontal conveyor 30 and the free end of the conveyor screw 25 of vertical conveyor 20 are always located in the vicinity of the bottom of the ship to be unloaded.

The unloading apparatus constructed according to the invention is particularly suitable for use in connection with barges, but can equally well be used for unloading ocean-going ships. It is always ensured that bulk material can be taken up from the very bottom of the ship to be unloaded. As a result of a corresponding telescopic construction of the screw blades or screw flight of the conveyor screw 25 of vertical conveyor 20 it is ensured that even in the case of vertical adjustability of horizontal conveyor 30, the screw conveyor is not damaged by striking the ship's bottom. Conveyor screw 35 of the horizontal conveyor is constructed in such a way that the receiving capacity of screw 35 increases from its free end in the direction of guide plate 40, so that the screw can take up further bulk material in this area, in spite of the bulk material advanced by the screw.

I claim:

1. An apparatus for unloading bulk material from ships comprising an elongated vertical conveyor, means for dependently pivotally supporting the upper end of said vertical conveyor, said vertical conveyor comprises an elongated vertical conveyor screw having a vertical axis and an elongated vertical bracing tube laterally enclosing said vertical conveyor screw so that said vertical conveyor screw can convey loose material from the lower end to the upper end of said vertical bracing tube, only a single elongated horizontal conveyor having a first end and a second end with the first end thereof located adjacent the lower end of said vertical screw conveyor, said horizontal conveyor comprising only a single elongated horizontal conveyor screw having a first end and a second end and a horizontal axis, and a casing extending along said horizontal conveyor screw having a first end and a second end, wherein the improvement comprises that said vertical screw conveyor has a lower end and an upper end with the lower end thereof extending downwardly out of the lower end of said bracing tube, said horizontal conveyor has a top side, a bottom side, and first and second sides extending between the top and bottom sides and located on opposite sides of said horizontal screw conveyor, said casing for said horizontal conveyor extends along the second side of and over the top side of said horizontal screw conveyor and said casing is open along the first side and the bottom side of said horizontal screw conveyor, said casing is closed at the first and second ends of said horizontal screw conveyor, and the first end of said casing is located adjacent the lower end of said vertical screw conveyor and the first end of said casing comprises a guide plate extending transversely across and obliquely of the axis of said horizontal screw conveyor from the first side to the second side of said horizontal screw conveyor for guiding the material conveyed by said horizontal screw conveyor to the lower end of said vertical screw conveyor, wherein the axis of said horizontal screw conveyor is offset laterally from the axis of said vertical screw conveyor so that the first side of said horizontal screw conveyor is closer to the axis of said vertical screw conveyor than the second side of said horizontal screw conveyor.

2. An apparatus, as set forth in claim 1, wherein the axis of said horizontal screw conveyor extends at right angles to the axis of said vertical screw conveyor.

3. An apparatus, as set forth in claim 1, wherein said means comprises a jib having a first end and a second end, said vertical conveyor is pivotally connected to the first end of said jib, a support structure pivotally mounting the second end of said jib so that said vertical conveyor can be moved vertically and laterally for the unloading operation.

4. An apparatus, as set forth in claim 1, wherein said horizontal conveyor includes a suction device with at least one suction nozzle for sucking up bulk material residues left behind by said horizontal screw conveyor.

5. An apparatus, as set forth in claim 4, wherein said suction device is connected to said bracing tube for directing the material picked up by said suction device to said vertical conveyor screw.

6. An apparatus, as set forth in claim 4, wherein said suction device comprises one said suction nozzle having a length corresponding to the length of said horizontal conveyor between the first and second ends thereof.

7. An apparatus, as set forth in one of claims 1, 2, 3, 4, 5 or 6, wherein said bracing tube includes an upper section and a lower section with said lower section being telescopically extendible and retractible relative to said upper section, said vertical screw conveyor has an upper section and a lower section with said lower section being axially extendible relative to and downwardly from said upper section for varying the length of said vertical screw conveyor and said lower section of said vertical screw conveyor comprises resiliently elastic screw channel sections connected with the lower section of said bracing tube.

8. An apparatus, as set forth in claim 1, wherein said horizontal conveyor is pivotally attached to said bracing tube so that said horizontal conveyor can be pivoted about the vertical axis of said vertical conveyor.

9. An apparatus, as set forth in claim 1, wherein the first end of said casing is secured to the lower end of said bracing tube.

10. An apparatus, as set forth in claim 9, wherein said horizontal conveyor includes a drive member for driving said horizontal screw conveyor so that said horizontal screw conveyor moves material in the direction from the second end toward the first end thereof, and said guide plate extends obliquely of the axis of said horizontal screw conveyor from the side of said casing extending along the second side of said horizontal screw conveyor laterally toward the axis of said vertical screw conveyor so that an obtuse angle is formed between the side of said casing and said guide plate.

* * * * *